United States Patent
Gabriel

(10) Patent No.: US 6,434,230 B1
(45) Date of Patent: Aug. 13, 2002

(54) RULES-BASED QUEUING OF CALLS TO CALL-HANDLING RESOURCES

(75) Inventor: Camille Gabriel, Baulkham Hills (AU)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/241,717

(22) Filed: Feb. 2, 1999

(51) Int. Cl.[7] ............................................... H04M 3/00
(52) U.S. Cl. ......................... 379/265.01; 379/265.02; 379/265.11; 379/265.12; 379/265.13; 379/266.01; 379/266.02; 379/309
(58) Field of Search ..................... 379/265.01, 265.02, 379/265.11, 265.12, 265.13, 266.01, 266.02, 309

(56) References Cited

U.S. PATENT DOCUMENTS

| | | | |
|---|---|---|---|
| 5,206,903 A | * 4/1993 | Kohler et al. | 379/309 |
| 5,335,269 A | * 8/1994 | Steinlicht | 379/266.01 |
| 5,506,898 A | * 4/1996 | Costantini et al. | 379/266.01 |
| 5,592,542 A | * 1/1997 | Honda et al. | 379/265.01 |
| 5,592,543 A | * 1/1997 | Smith et al. | 379/265.01 |
| 5,754,639 A | * 5/1998 | Flockhart et al. | 379/221.01 |
| 5,784,452 A | * 7/1998 | Carney | 379/265.01 |
| 5,825,869 A | * 10/1998 | Brooks et al. | 379/265.01 |
| 5,946,388 A | * 8/1999 | Walker et al. | 379/266.01 |
| 6,064,731 A | * 5/2000 | Flockhart et al. | 379/265.06 |
| 6,088,444 A | * 7/2000 | Walker et al. | 379/266.01 |
| 6,222,919 B1 | * 4/2001 | Hollatz et al. | 379/265.12 |

FOREIGN PATENT DOCUMENTS

| | | | |
|---|---|---|---|
| EP | 0740450 A2 | 10/1996 | H04M/3/50 |
| EP | 0 863 651 A2 | 12/1998 | H04M/3/523 |
| EP | 0 982 917 A1 | 3/2000 | H04M/3/523 |

* cited by examiner

*Primary Examiner*—Ahmad F. Matar
*Assistant Examiner*—Bing Bui
(74) *Attorney, Agent, or Firm*—David Volejnicek

(57) ABSTRACT

Resolution of contention over resources (102–105) in an automatic call distribution (ACD) system (101). Call (201) attributes (202) and resource (221) attributes (222) are defined (140,130). Rules (211) match calls' attributes with resources' attributes, Rules have priorities (212) comprising an initial value (213) and a function (214) that changes the value over time. Rules preferably define call coverage paths (215). Each resource has its own call queue (121–129). Rules are matched (230) to arriving call's attributes, to determine (240) resources that can handle the call. A token (250) for every matching rule is placed in the queues of all resources that can handle the call, at a position determined by the rule's priority. The priority and queue position changes over time according to the rule's time function. When a resource dequeues the call's token to process the call, tokens for the call are removed from all queues.

23 Claims, 2 Drawing Sheets

RULES-BASED QUEUING OF CALLS TO CALL-HANDLING RESOURCES

TECHNICAL FIELD

This invention relates generally to resource-allocation arrangements, and relates specifically to resolution of contention for resources in call centers, also known as telemarketing systems or automatic call distribution (ACD) systems.

BACKGROUND OF THE INVENTION

Call centers are systems that enable a pool of agents to serve incoming and/or outgoing calls (or other types of communications), with the calls being automatically distributed and connected to whichever of the agents are available at the time. When no agents are free and available to handle additional calls, additional incoming calls are typically placed in a hold queue—they are enqueued—to await agents becoming available. Conversely, when no calls are available for handling, free agents are enqueued to await calls becoming available. It is common practice to divide the pool of agents into a plurality of groups, commonly known as splits, and to assign different types of calls to different splits. For example, different splits may be designated to handle calls pertaining to different client companies, or calls pertaining to different products or services of the same client company. Each split typically has its own call queue and agent queue.

The agents in different splits may have different skills—different language skills, for example—and calls requiring different ones of these skills are then directed to different ones of these splits. Agents, and optionally calls, may be assigned to different skills at different priorities, or skill levels, which reflect the proficiency in this skill possessed by the agent or required of the agent by the call. Agents typically have, and calls may require, a plurality of skills of various skill levels. Those agents and calls are then assigned to a plurality of splits corresponding to those skills.

The above-described approach for resolving the resource-contention problem in call centers lacks richness in defining types of calls and types of resources. It also does not provide adequate flexibility in the prioritization of calls. Moreover, it is a static description that does not describe the dynamic behavior of requests. Another drawback is that the meaning of the splits may change, and it is very hard to keep these ever-changing splits up-to-date with this approach in the ever-changing business environment of the call center.

SUMMARY OF THE INVENTION

This invention is directed to solving these and other problems and disadvantages of the prior art. Illustratively according to the invention, resolution of contention over resources in a call center is effected as follows:

Attributes are defined for calls and for resources.

Rules are defined that match calls having some specific attributes with resources that have corresponding specific attributes.

Priorities are assigned to rules. A priority preferably comprises an initial value and a time function that defines how the value changes with time.

Preferably, each rule defines one or more attributes of resources that can serve as a coverage path for calls.

Each resource has an associated call queue.

When a call arrives, rules are matched to the call, and the matching one or more rules determine the set of resources that are able to handle the call.

A token for every matching rule for the call is placed in the queues of all of the resources that are able to handle the call.

The position of the call's token in a queue is determined by the priority value of the rule. The priority, and hence the call's place in the queue, changes with time according to the rule's corresponding time function.

The term "call" is used generally herein to mean any communication or other request for (needing) a resource.

The invention allows a business to build a call-treatment solution in high-level constructs representative of the needs of the business, rather than by using artificial (unnatural to the business) low-level constructs and implicitly mapping the business constructs onto them. It provides functionality that has hitherto not been readily available in call centers such as prioritization of calls, coverage paths based on rules, call preemption, and others.

Generally according to the invention, distribution of resource requests (e.g., calls) among resources for processing the requests is effected as follows. At least one request attribute is determined for a request to be processed. At least one resource attribute that corresponds to the determined at least one request attribute is then found by searching a plurality of rule definitions each defining a correspondence between at least one request attribute and at least one resource attribute that is needed for processing a request having the at least one request attribute. Then at least one resource that has the found at least one resource attribute is found by searching a plurality of resource definitions each defining a correspondence between one of a plurality of resources and at least one resource attribute possessed by the one resource. Each one of the plurality of resources has its own request queue for requests to be processed by the one resource, and the request is enqueued in the request queue of each one of the found resources. Each rule definition defines a priority of the corresponding rule, and enqueuing the request involves enqueuing the request in the request queue of each one of the found resources at the priority of the rule that lead to the finding of the one resource. In response to one of the found resources processing the request (e.g., removing the request from its request queue), the request is removed from all of the request queues. Preferably, at least one rule definition further defines a function for changing the priority of the corresponding rule over time, and enqueuing further comprises changing the priority of the request over time in the request queue of each one of the resources found by the at least one rule according to the function of the rule definition of the at least one rule. Alternatively or additionally, the rule definition of at least one of the rules preferably further defines a coverage path of the one rule, and enqueuing involves estimating the minimum in-queue waiting time for the request in the request queues of the resources found by the one rule, enqueuing the request in the request queues of the resources in response to the minimum estimated in-queue waiting time not exceeding a threshold, and enqueuing the request in the request queue of a resource identified by the coverage path of the one rule in response to the minimum estimated in-queue waiting time exceeding the threshold.

The invention encompasses both a method for performing the just-characterized procedure, and an apparatus that effects the method steps. The apparatus preferably includes an effector—any entity that effects the corresponding step, unlike a means—for each step. Further, the invention encompasses a computer-readable medium containing software which, when executed in a computer, causes the computer to perform the method steps.

These and other features and advantages of the invention will become more evident from the following description of an illustrative embodiment of the invention considered together with the drawing.

DETAILED DESCRIPTION

Figure 1:
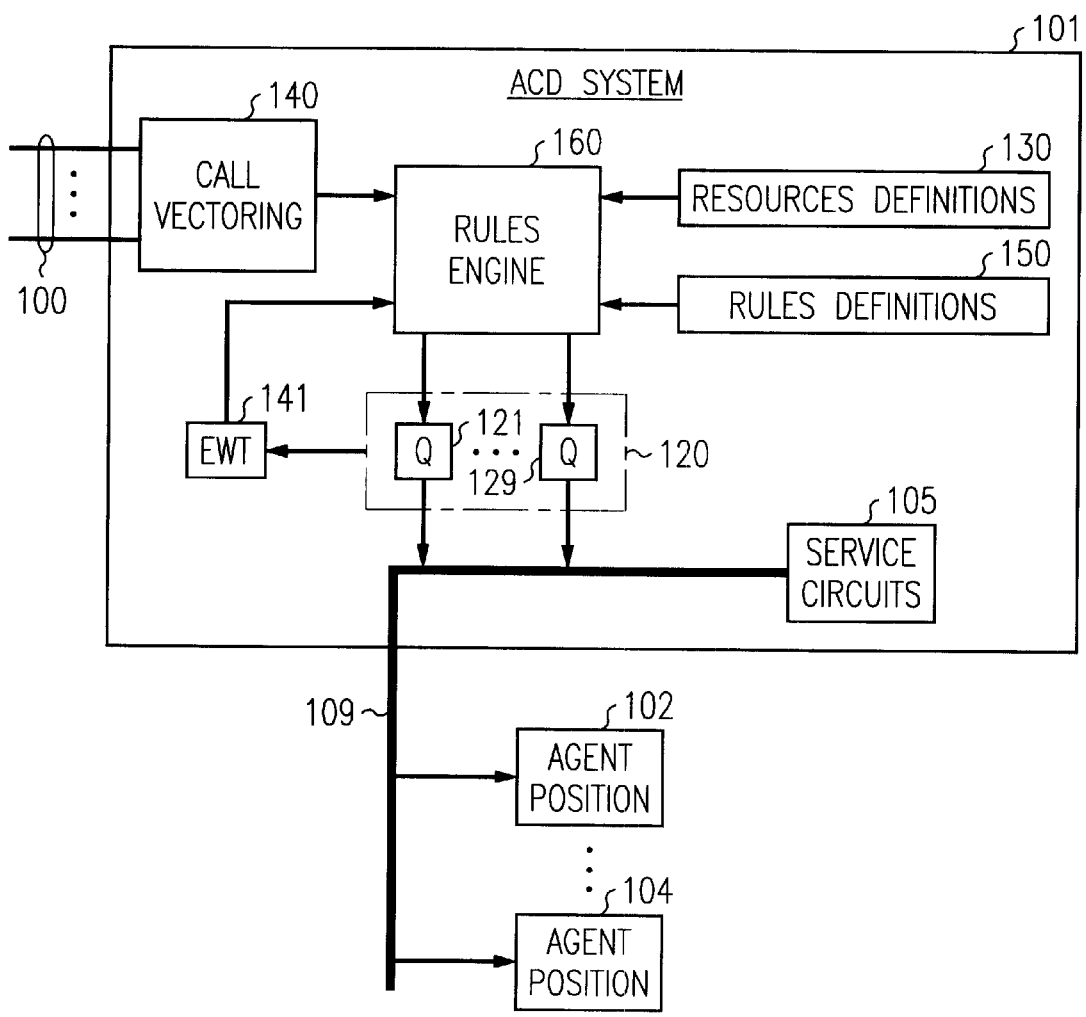
FIG. 1 is a block diagram of a call center that includes an illustrative embodiment of the invention.

FIG. 1 shows an illustrative call center. As is conventional, the call center comprises a plurality of telephone lines and/or trunks 100 selectively interconnected with a plurality of agent positions 102–104 via an ACD system 101. Lines and trunks 100 may also include data connections, such as Internet or other local area network or wide area network connections, each defining one or more virtual channels. Each agent position 102-104 includes a voice-and-data terminal for use by a corresponding agent in handling calls. Agent positions 102–104 are connected to ACD system 101 by a voice-and-data transmission medium 109.

ACD system 101 is illustratively the Lucent Technologies Definity® private-branch exchange (PBX)-based ACD system. It is a stored-program-controlled system that conventionally includes interfaces to external communications links, a communication switching fabric, service circuits (e.g. announcement circuits, call answering circuits, interactive voice response systems, text-to-speech and speech-to-text converters, and other call processing resources) 105, one or more memories of various kinds (e.g., fixed, portable, magnetic, random access, etc.) for storing control programs and data, and a processor for executing the stored control programs to control the interfaces and the fabric and to provide automatic call-distribution functionality. Included among the data stored in ACD systems 101 are a set 120 of call queues 121–129. Included among the control programs in ACD systems 101 is a call vector 140, and an estimated wait-time (EWT) function 141 that estimates how long a call will have to wait in a queue 121–129 before being handled. As described so far, the call center of FIG. 1 is conventional.

According to the invention, call vector 140 is configured to associate attributes with calls. A call attribute may be, or may be a function of, the calling or called telephone directory number or Internet Protocol address, the type of communications instrument making the call (identified, for example, by the II digits of the call setup message), or any other information that can be discerned from the call context, the call itself, the status of the call center, the business status, customer business history, and/or customer communications history. The call may be thought of as being a request for resources that can serve a call with those attributes.

Included among the data stored in ACD system 101 are resource definitions 130 and rule definitions 150. Resource definitions 130 list the resources (e.g., service circuits and agents) that are present in the call center for handling calls and the attributes (capabilities) of each resource. Rule definitions 150 define rules that are used to match call attributes with resource attributes to select one or more resources for handling each call. Included among the control programs in ACD system 101 is a rules engine 160 that uses resource definitions 130, rule definitions 150, and call attributes, to match calls with resources and to distribute the calls among queues 121–129 accordingly.

Figure 2:
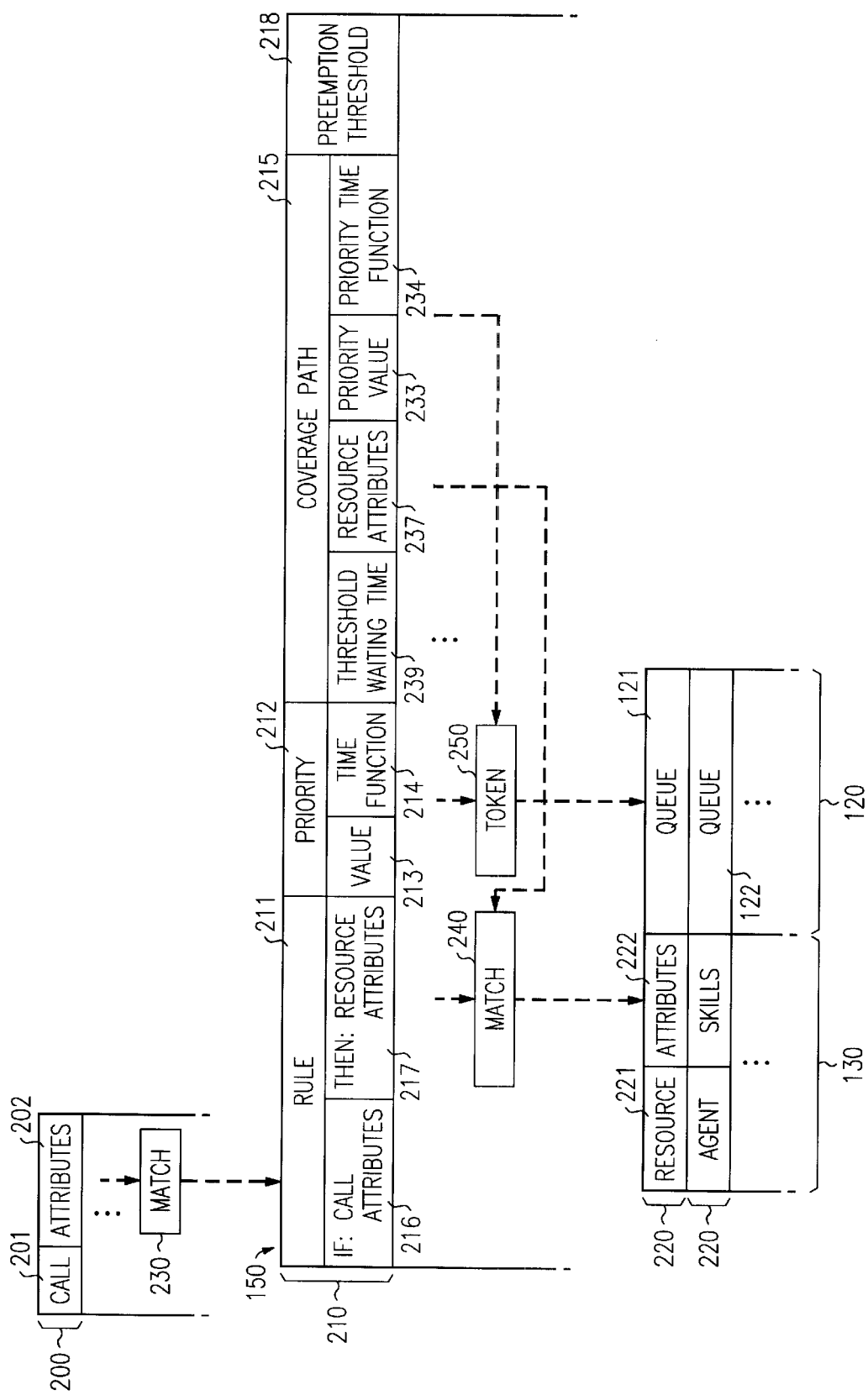
FIG. 2 is a block diagram of data structures and functionality of the ACD system of the call center of FIG. 1.

FIG. 2 represents in greater detail the internal configuration and workings of ACD system 101 that are relevant to this invention. For every call that is to be handled by ACD system 101, the output of call vector 140 to rules engine 160 includes an entry 200 comprising an identifier 201 of the call and one or more attributes 202 of the call (discussed above). Rule definitions 150 include a plurality of rule entries 210, one per rule 211. A rule is a logical definition, or algorithm, that identifies one or more resources to handle a certain type of call. A rule may apply to all calls, or to a subset thereof. The subset is defined by conditions based on expressions built from possible attributes 202 of calls. Illustratively, a rule 211 is expressed in the form of an "if, then" statement, where the "if" portion 216 lists the attributes of calls to which the rule applies and the "then" portion 217 lists the attributes that a resource must have to handle those calls. Each rule entry 210 contains the rule 211 itself, a priority 212 of the rule relative to other rules, which comprises an initial priority value 213 of the rule and a time function 214 that defines how the priority value changes over time, and a presumption threshold 218 that defines when processing of a call that has been assigned to a resource by this rule 211 may be preempted. It operates as follows. When a call starts to be processed by a resource, it keeps the priority which it had when it was dequeued for processing. If during that processing the priority of another call enqueued at the head of that same queue exceeds the priority of the call that is being processed, by the latter call's preemption threshold, then processing of the latter call is preempted by the processing of the other call. The resource doing the processing is notified of the preemption and deals with it accordingly.

A rule entry 210 optionally includes a coverage path rule 215 which defines another set of resource attributes 237 required to handle the certain type of calls if the minimum estimated waiting time for each of the resources identified by the main rule is higher than a certain threshold waiting time 239. The coverage path rule may have a different priority 233 (usually lower) than the main rule, and a corresponding priority time function 234. In the simple case of priority values 213 not changing over time, and queues 121–129 being true first-in, first-out queues, the minimum estimated waiting time is preferably computed as follows.

Assume the following conventions:

H(Tx) stands for the average handling time of call x.

Ew(Tx) stands for estimated waiting time for call x, known from EWT 141.

Ew(Tx/Qn) is the estimated waiting time of call x if it were present in only one queue n. (A call can appear in several queues 121–129.)

TQn is the average handling time for call x being handled by the resource corresponding to queue n minus the time already spent handling call x.

Then $$Ew(Tn+1)=Ew(Tn/Qx)+H(Tn),$$

and $$Ew(Tn)=\text{Min}_x[Ew(Tn/Qx)].$$

In other words, the estimated waiting time for any call (n+1) waiting directly after a call n in a queue x will be the average handling time of call n plus the estimated waiting time of call n. The estimated waiting time of call n is the minimum of all the estimated waiting times on all of the queues in which call n is enqueued.

Estimation of the waiting time in queues where the order of calls in the queues changes dynamically according to time functions is preferably affected via the use of a simulator that can simulate the appearance of calls and their consumption by resources (as stochastic processes given some parameters setting the behavior of the frequency of appearance and average time of consumption), and performs the reordering in the queues according to priority time functions; the simulator does not simulate behavior that requires the estimated waiting time. The simulator starts from an initial status copied from a snapshot of all the queues at a given point of time. The simulator then quickly simulates the behavior of the queues. It takes note of the consumption time of every call that was in the queue at the beginning of the simulation (those calls are the real calls actually waiting in the queues at the time of the beginning of the simulation). When the last of those preexisting calls is consumed, the simulation stops. The end of the simulation yields the estimated waiting time of all the calls in the system.

Resources definitions 130 include a plurality of entries 220, one per resource. A resource for handling a call may be a circuit, a function, or an agent. Each resource entry 220 contains an identification 221 of the resource, the attributes 222 of the resource, and one of a plurality of call queues 121–129 that corresponds to that resource. Resource attributes 222 include capabilities of the resource, e.g., the skills possessed by an agent. The call queues 121–129 of all resource entries 220 together form the set of call queues 120 of FIG. 1.

When a call appears, rules engine 160 performs a match 230 between attributes 203 of the call and rules 211 to find a rule that applies to this type of call. Rules engine 160 then performs a match 240 between the selected rule 211 and attributes 222 of resources definitions 130 to find a set of one or more resources 221 that satisfies the selected rule 211. Rules engine 160 then places at token 250, representative of the selected rule 211 and identifying the subject call, in the queue of each resource 221 in the set. Tokens 250 are ordered in each queue by the priority of their corresponding rules 211. Priorities change with time as determined by time function 214 of each rule 211. A token 250 with a sufficiently-high priority may even preempt a call that is already being served by a resource 221. If it is intelligent and responsible enough, a resource 221 (e.g., and agent) may be given the ability to inspect tokens 250 representing the calls waiting in its queue and pick one at its own deliberation. Usually, however, a resource 221 will handle the waiting call with (i.e., whose corresponding token 250 has) the highest present priority in the queue.

The system as described above assumes that there are usually more calls than resources. In the opposite case, where resources may be sitting idle waiting for calls, the system works by applying a fairness rule. For each resource, a log or a tally is kept of each type of token consumed (served) by that resource. When several resources are available to handle a call and are matched by different rules, the following algorithm is used to identify one of the available resources to serve the call:

The rule with the highest priority that has a corresponding available resource is chosen. If multiple rules have the same priority, one is chosen randomly.

For a rule that has several available matching resources, the call is assigned to the resource that has the smallest tally of tokens for that rule.

The following example will serve to better illustrate the functionality of the invention. Assume a loan brokerage agency that deals mainly with home loans. Three people work in the agency, and handle home loan inquiries and applications over the phone. The people are the resources 221 for which the calls contend. The possible resource attributes are selected to be:

Foreign languages (Italian, French)
General home loan information
Business home loan information
Refinance specialist
Legal knowledge
Valuation expert (rural, suburban, business district)
Bank products specialist (General Banking Ltd., National Bank, Rural Credit Union...)
Loan amount limit (#####)

Resources definitions 130 are administered as follows:

Resource: George Haynes
  Attributes: Foreign languages: French
    General home loan information
    Legal knowledge
    Loan amount limit (300,000)
  Queue: 121
Resource: Nicholas Smith
  Attributes: General home loan Information
    Valuation expert
    Bank products specialist (General Banking Ltd.)
    Loan amount limit (400,000)
  Queue: 122
Resource: Myrna Hepburn
  Attributes: Refinance specialist
    Business home loan information
    Legal knowledge
    Loan amount limit: (no limit)
  Queue: 123

Rules definitions 150 are administered as follows:

Rule1: call type "general" (phone call on hot line 1800 . . . )
  Required attributes: General home loan information
  Priority value: 3
  Time function: increase by one every 1 minute.
  Priority preemption: 10
  Coverage path: Business home loan information, in 5 minutes. Priority 3 increase by 1 every minute.
Rule2: call type "general" and calling number is among "numbers of client real estate investment companies"
  Required attributes: Business home loan information
  Loan amount limit: no limit Priority: 9
  Time function: multiply by 2 every minute.

With ACD system 101 thus initialized, the following scenario plays out:

Start of business day, all resources are available.
George's tally of calls handled due to rule 1 is 123 this month.
Nicholas' tally of calls handled due to rule 1 is 116 this month.
A call of type "general" arrives, identified as "contact1."
Rule1 matches contact1 to both Nicholas and George.
Nicholas's tally for rule 1 being lower and both being available, the call is given to Nicholas.
  While Nicholas is busy, another call of type "general" arrives, identified as "contact2." Rule1 matches contact 2 to both George and Nicholas.
Nicholas is busy, but George is available. A token of the form <contact2, rule1> is put in both queues 121 and 122. George handles it.

A few more calls (contact3, contact4, contact9) of type "general" arrive and are queued to both George's and Nicholas' queue 121 and 122.

Myrna is still idle.

On contact9, the estimated waiting time for George and Nicholas (all resources that can match rule1) becomes greater than 5 minutes. When a new call (contact10) of type "general" arrives, 6 minutes later than contact3, the priority of contact 3 has become 3+6×1=9

Since the expected waiting time for contact110 is greater than 5 minutes the—threshold for the coverage path—contact110 is sent to the coverage path of rule1 and is placed in queue 123. Myrna starts handling contact110.

While Myrna is handling contact10, a call matching rule1 and rule2 (1800 number and from a known business number) arrives, identified as "contact 11."

A token of the form <contact11, rule 1> is queued to George's and Nicholas' queues 121 and 122, and a token of the forms <contact 11, rule2> is queued to Myrna's queue 123, with an initial priority of 9. Myrna is busy handling contact10 and contact 11 is not handled. After one minute, the priority token <contact11, rule2> becomes 18, which is higher than the priority of <contact10, rule1 coverage path>by 15. This is higher than the preemption difference by 5. Myrna is notified of this very important call that has been waiting for one minute. She may drop contact10 or place it on hold and resume it later, and handle contact 11 instead.

Of course, various changes and modifications to the illustrative embodiment described above will be apparent to those skilled in the art. For example, the token can be either moved or copied to the queues of the resources that form the coverage path. Also, the preemption threshold can be associated with a resource instead of a rule. Or, there may be a global threshold for the entire call center. Furthermore, the behavior upon preemption may vary: for example, instead of the preemption call being interrupted, the resource may merely be notified of the preemption. Other variations include frequency of update of priorities, the vocabulary for describing the priority functions and the attributes of calls and resources, and the grammar for describing conditional expressions based on the attributes and their domains of definitions. Moreover, while the invention is described within the context of a call center, it is applicable to any request-to-resource matching situation in any environment. What's more, the basic arrangement may be supplemented with tools that (a) verify correctness of a configuration (ensure that the expressions used in the rules are well-formed and correct, e.g., type checking, and ensure that the attributes assigned to calls and resources are not contradictory), (b) verify completeness of a configuration (check that there are no calls that can not be matched by any rule, and check that there are not resources that can not be matched by any rule), (c) detect redundancy in a configuration (check for rules that are either not applicable or semantically the same), (d) estimate one of resource requirements, request load estimates, and their acceptable waiting times as a function of the other two (as there is a relationship between call loads, number of resources, and waiting times for each configuration, endeavor to calculate, for a certain configuration, one of the parameters given the other two as requirements), (e) simulate the real-time behavior of a configuration (show the queue sizes, the types of rules that match most, that are answered most, the number of coverage paths used, etc., to allow a person who is defining a configuration to evaluate it and fine-tune it before deploying it in a live environment.), etc. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A method of distributing requests among resources for processing the requests, comprising:

in response to a request to be processed, determining request attributes of the request;

in response to the determining, finding among a plurality of resources each comprising a different one and only one entity capable of processing a request at least one resource that corresponds to the determined request attributes, by searching a plurality of rule definitions each defining a correspondence between at least one request attribute and at least one resource that is needed for processing a request having the at least one request attributes; and in response to the finding of at least one resource, enqueuing the request in a request queue of each one of the found resources, each one of the plurality of resources having its own request queue, and for processing only requests enqueued in its own request queue, wherein:

each rule definition further defines a priority of the corresponding rule, and at least one rule definition further defines a function for changing the priority of the corresponding rule over time; and enqueuing comprises enqueuing the request in the request queue of each one of the found resources at the priority of the rule that led to the finding of the one resource, over time changing the priority of the request in the request queue of each one of the resources found by the at least one rule according to the function of the rule definition of the at least one rule, and requeuing the request in the request queue of each one of the resources found by the at least one rule according to the changed priority of the request in that request queue.

2. The method of claim 1 wherein:

finding comprises finding at least one resource attribute that corresponds to the determined request attributes by searching the plurality of rule definitions each defining a correspondence between at least one request attribute and at least one resource attribute that is needed for processing a request having the at least one request attribute; and in response to finding at least one resource attribute, finding at least one resource among the plurality of the resources that has the found at least one resource attribute, by searching a plurality of resource definitions each defining a correspondence between one of a plurality of resources and at least one resource attribute possessed by the one resource.

3. The method of claim further comprising:

in response to one of the found resources processing the request, removing the request from all of the request queues.

4. The method of claim 1 wherein the request comprises a call.

5. The method of claim 1 wherein:

the plurality of resources each comprise one of (a) a different single one agent, (b) a different single one service circuit, and (c) a different single one function.

6. A method of distributing requests among resources for processing the requests, comprising:

in response to a request to be processed, determining request attributes of the request;

in response to the determining, finding among a plurality of resources each comprising a different one and only one entity capable of processing a request at least one resource that corresponds to the determined request attributes, by searching a plurality of rule definitions each defining a correspondence between at least one request attribute and at least one resource that is needed for processing a request having the at least one request attribute; and in response to the finding of at least one resource, enqueuing the request in a request queue of each one of the found resources, each one of the plurality of resources having its own request queue, and for processing only requests enqueued in its own request queue, wherein:

each rule definition further defines a priority of the corresponding rule, and the rule definition that led to the finding of the found resources further defines a preemption threshold;

enqueuing comprises enqueuing the request in the request queue of each one of the found resources at the priority of the rule that led to the finding of the one resource; and the method further comprises one of the found resources removing the request from its request queue and processing the request, and in response to another request being enqueued in the request queue of the one of the found resources at a priority that exceeds by the preemption threshold the priority at which the request that is being processed was enqueued, preempting the processing of the request that is being processed by processing of the other request.

7. A method of distributing requests among resources for processing the requests, comprising:

in response to a request to be processed, determining request attributes of the request;

in response to me determining, finding among a plurality of resources each comprising a different one and only one entity capable of processing a request at least one resource that corresponds to the determined request attributes, by searching a plurality of rule definitions each defining a correspondence between at least one request attribute and at least one resource that is needed for processing a request having the at least one request attribute; and in response to the finding of at least one resource, enqueuing the request in a request queue of each one of the found resources, each one of the plurality of resources having its own request queue, and for processing only requests enqueued in its own request queue, wherein:

the rule definition of at least one of the rules further defines a coverage path of the one rule; and enqueuing comprises estimating a minimum in-queue waiting time for the request in the request queues of the resources found by the one rule, in response to an estimated minimum in-queue waiting time not exceeding a threshold, enqueuing the request in the request queues of the resources found by the one rule, and in response to the estimated minimum in-queue waiting time exceeding the threshold, enqueuing the request in the request queues of at least one resource, other than the found resources, identified by the coverage path of the one rule.

8. The method of claim 7 wherein:

each rule definition further defines a priority of the corresponding rules; and enqueuing comprises enqueuing the request in the request queue of each one of the found resources at the priority of the rule that led to the finding of the one resource.

9. A method of distributing requests among resources for processing the requests, comprising:

in response to a request to be processed, determining request attributes of the request;

in response to the determining, finding among a plurality of resources each comprising a different one and only one entity capable of processing a request at least one resource attribute that corresponds to the determined request attributes, by searching a plurality of rule definitions each defining a correspondence between at least one request attribute and at least one resource attribute that is needed for processing a request having the at least one request attribute;

in response to finding at least one resource attribute, finding at least one resource among the plurality of the resources that has the found at least one resource attribute, by searching a plurality of resource definitions each defining a correspondence between one of a plurality of resources and at least one resource attribute possessed by the one resource; and in response to the finding of at least one resource, enqueuing the request in a request queue of each one of the found resources, each one of the plurality of resources having its own request queue, and for processing only requests enqueued in its own request queue, wherein:

each rule definition further defines an initial priority of the corresponding rule, a function for changing the priority of the corresponding rule over time, and a coverage path of the corresponding rule; and enqueuing comprises estimating a minimum in-queue waiting time for the request in the request queues of the resources found by a rule, in response to the estimated minimum in-queue waiting time not exceeding a threshold, enqueuing the request in the request queue of a resource found by the rule at the initial priority of the rule, in response to the estimated minimum in-queue waiting time exceeding the threshold, enqueuing the request in the request queue of a resource identified by the coverage path of the rule, over time changing the priority of the request in the request queue in which it is enqueued according to the function of the rule definition of the rule, and re-queuing the request in the request queue in which it is enqueued according to the changed priority of the request in the request queue in which it is enqueued; and the method further comprising in response to one of the found resources processing the request, removing the request from all of the request queues.

10. A method of distributing requests among resources for processing the requests, comprising:

in response to a request to be processed, determining request attributes of the request;

in response to the determining, finding among a plurality of resources each comprising a different one and only one entity capable of processing a request at least one resource attribute that corresponds to the determined request attributes, by searching a plurality of rule definitions each defining a correspondence between at least one request attribute and at least one resource attribute that is needed for processing a request having the at least one request attribute;

in response to finding at least one resource attribute, finding at least one resource among the plurality of the resources that has the found at least one resource attribute, by searching a plurality of resource is definitions each defining a correspondence between one of a plurality of resources and at least one resource attribute possessed by the one resource; and in response to the finding of at least one resource, enqueuing the request in a request queue of each one of the found resources, each one of the plurality of resources having its own request queue, and for processing only requests enqueued in its own request queue, wherein:

each rule definition further defines an initial priority of the corresponding rule, a function for changing the priority of the corresponding rule over time, and a coverage path of the corresponding rule, and the rule definition that led to the finding of the found resources further defines a preemption threshold;

enqueuing comprises estimating a minimum in-queue waiting time for the request in the request queues of the resources found by a rule, in response to the estimated minimum in-queue waiting time not exceeding a threshold, enqueuing the request in the request queue of a resource found by the rule at the initial priority of the rule, in response to the estimated minimum in-queue waiting time exceeding the threshold, enqueuing the request in the request queue of a resource identified by the coverage path of the rule, over time changing the priority of the request in the request queue in which it is enqueued according to the function of the rule definition of the rule, and re-queuing the request in the request queue in which it is enqueued according to the changed priority of the request in the request queue in which it is enqueued; and the method further comprising in response to one of the found resources processing the request, removing the request from all of the request queues, and in response to another request being enqueued in the request queue of the one of the found resources at a priority that exceeds by the preemption threshold the priority at which the request that is being processed was enqueued when it was removed from the request queues, preempting the processing of the request that is being processed by processing of the other request.

11. An apparatus that performs the method of claims 2 or 3 or 8 or 1 or 6 or 7 or 9 or 10 or 4 or 5.

12. A computer readable medium containing software which, when executed in a computer, causes the computer to perform the method of claim 2 or 3 or 8 or 1 or 6 or 7 or 9 or 10 or 4 or 5.

13. An apparatus for distributing requests among resources for processing the requests, comprising:

means for determining attributes of an individual request;

means for defining a plurality of request queues each corresponding to a different one of a plurality of resources each comprising a different one and only one entity capable of processing a request, for enqueuing requests, each one of the plurality of resources having its own request queue for processing only requests enqueued by its own request queue;

means for storing a plurality of rule definitions each defining a correspondence between at least one request attribute and at least one resource that is needed for processing a request having the at least one request attribute;

means responsive to the individual request having at least one determined request attribute, for finding from the rules definitions at least one resource that corresponds to the at least one determined request attribute; and means responsive to the finding of the at least one resource, for enqueuing the individual request in the request queue of each of the found resources, wherein:

each rule definition further defines a priority of the corresponding rule, and at last one rule definition further defines a function for changing the priority of the corresponding rule over time; and the enqueuing means comprise means for enqueuing the request in the request queue of each one of the found resources at the priority of the rule that led to the finding of the one resource, means for changing over time the priority of the request in the request queue of each one of the resources found by the at least one rule according to the function of the rule definition of the at least one rule, and means for requeuing the request in the request queue of each one of the resources found by the at least one rule according to the changed priority of the request in that request queue.

14. An apparatus for distributing requests among resources for processing the requests, comprising:

means for determining attributes of an individual request;

means for defining a plurality of request queues each corresponding to a different one of a plurality of resources each comprising a different one and only one entity capable of processing a request, for enqueuing requests, each one of the plurality of resources having its own request queue for processing only requests enqueued by its own request queue;

means for storing a plurality of rule definitions each defining a correspondence between at least one request attribute and at least one resource that is needed for processing a request having the at least one request attribute;

means responsive to the individual request having at least one determined request attribute, for finding from the rules definitions at least one resource that corresponds to the at least one determined request attribute; and means responsive to the finding of the at least one resource, for enqueuing the individual request in the request queue of each of the found resources, wherein:

each rule definition further defines a priority of the corresponding rule, and the rule definition that led to the finding of the found resources further defines a preemption threshold;

the enqueuing means comprise means for enqueuing the request in the request queue of each one of the found resources at the priority of the rule that led to the finding of the one resource; and the apparatus further comprises means responsive to another request being enqueued, in the request queue of one of the found resources that has removed the individual request from its request queue and is processing the individual request, at a priority that exceeds by the preemption threshold the priority at which the individual request that is being processed was enqueued, for preempting the processing of the individual request that is being processed by processing of the other request.

15. The apparatus of claim 14 further comprising:

means responsive to one of the found resources processing the request, for removing the request from all of the request queues.

16. The apparatus of claim 15 further comprising:

means for receiving the requests for processing;

the plurality of resources for processing the requests; and means for connecting the received requests to the resources.

17. The apparatus of claim 16 wherein the requests comprise calls.

18. An apparatus for distributing requests among resources for processing the requests, comprising:

means for determining attributes of an individual request;

means for defining a plurality of request queues each corresponding to a different one of a plurality of resources each comprising a different one and only one entity capable of processing a request, for enqueuing requests, each one of the plurality of resources having its own request queue for processing only requests enqueued by its own request queue;

means for storing a plurality of rule definitions each defining a correspondence between at least one request an attribute and at least one resource that is needed for processing a request having the at least one request attribute;

means responsive to the individual request having at least one determined request attribute, for finding from the rules definitions at least one resource that corresponds to the at least one determined request attribute; and means responsive to the finding of the at least one resource, for enqueuing the individual request in the request queue of each of the found resources, wherein:

the rule definition of at least one of the rules further defines a coverage path of the one rule; and the enqueuing means comprise means for estimating a minimum in-queue waiting time for the request in the request queues of the resources found by the one rule, and means responsive to an estimated minimum in-queue waiting time not exceeding a threshold, for enqueuing the request in the request queues of the resources found by the one rule, and responsive to the estimated minimum in-queue waiting time exceeding the threshold, for enqueuing the request in the request queues of at least one resource, other than the found resources, identified by the coverage path of the one rule.

19. The apparatus of claim 18 wherein the means for finding comprise:

means for storing a plurality of resources definitions each defining attributes of a corresponding one of a plurality of request processing resources;

means responsive to a request having at least one determined request attribute, for finding from the rules definitions at least one resource attribute that corresponds to the at least one determined request attribute; and means responsive to finding at least one resource attribute, for finding from the resources definitions at least one resource among the plurality of the resources that corresponds to the found resource attribute.

20. The apparatus of claim 18 wherein;

the plurality of resources each comprise one of (a) a different single one agent, (b) a different single one service circuit, and (c) a different single one function.

21. The apparatus of claim 18 wherein:

each rule definition further defines a priority of the corresponding rule; and the enqueuing means comprise means for enqueuing the request in the request queue of each one of the found resources at the priority of the rule that led to the finding of the one resource.

22. An apparatus for distributing requests among resources for processing the requests, comprising:

means for determining attributes of an individual request;

means for defining a plurality of request queues each corresponding to a different one of a plurality of resources each comprising a different one and only one entity capable of processing a request, for enqueuing requests, each one of the plurality of resources having its own request queue for processing only requests enqueued by its own request queue;

means for storing a plurality of rule definitions each defining a correspondence between at least one request attribute and at least one resource that is needed for processing a request having the at least one request attribute;

means for storing a plurality of resources definitions each defining attributes of a corresponding one of a plurality of request processing resources;

means responsive to the individual request having at least one determined request attribute, for finding from the rules definitions at least one resource attribute that corresponds to the at least one determined request attribute;

means responsive to finding at least one resource attribute, for finding from the resources definitions at least one resource among the plurality of the resources that corresponds to the found resource attribute; and means responsive to the finding of the at least one resource, for enqueuing the individual request in the request queue of each of the found resources, wherein:

each rule definition further defines an initial priority of the corresponding rule, a function for changing the priority of the corresponding rule overtime, and a coverage path of the corresponding rule; and the enqueuing means comprise means for estimating a minimum in-queue waiting time for the request in the request queues of the resources found by a rule, means responsive to the estimated minimum in-queue waiting time not exceeding a threshold, for enqueuing the request in the request queue of a resource found by the rule at the initial priority of the rule, and responsive to the estimated minimum in-queue waiting time exceeding the threshold, for enqueuing the request in the request queue of a resource identified by the coverage path of the rule, and means for changing over time the priority of the request in the request queue in which it is enqueued according to the function of the rule definition of the rule, and for re-queuing the request in the request queue in which it is enqueued according to the changed priority of the request in the request queue in which it is enqueued; and the apparatus further comprising means responsive to one of the found resources processing the request, for removing the request from all of the request queues.

23. The apparatus of claim 22 wherein:

the rule definition that led to the finding of the found resources further defines a preemption threshold; and the apparatus further comprising means responsive to another request being enqueued in the request queue of the one of the found resources at a priority that exceeds by the preemption threshold the priority at which the request that is being processed was enqueued when it was removed from the request queues, for preempting the processing of the request that is being processed by processing of the other request.

* * * * *